United States Patent
Kulas

(10) Patent No.: US 7,539,302 B2
(45) Date of Patent: May 26, 2009

(54) DOCKABLE EARPIECE FOR PORTABLE PHONES

(76) Inventor: Charles J. Kulas, 651 Orizaba, San Francisco, CA (US) 94132

( * ) Notice: Subject to any disclaimer, the term of this patent is extended or adjusted under 35 U.S.C. 154(b) by 697 days.

(21) Appl. No.: 10/909,792

(22) Filed: Jul. 29, 2004

(65) Prior Publication Data

US 2005/0089186 A1 Apr. 28, 2005

Related U.S. Application Data

(60) Provisional application No. 60/514,771, filed on Oct. 27, 2003.

(51) Int. Cl.
*H04M 9/00* (2006.01)
*H04M 1/00* (2006.01)

(52) U.S. Cl. .............. 379/433.02; 379/420.02; 455/569.1

(58) Field of Classification Search ............ 379/433.02, 379/430, 431, 428.02, 420.01, 420.02, 420.03, 379/420.04, 433.01; 455/569.1, 575.2, 575.1, 455/90.2, 90.3
See application file for complete search history.

(56) References Cited

U.S. PATENT DOCUMENTS

| 5,881,149 | A * | 3/1999 | Weatherill | 379/433.02 |
| 6,942,173 | B1 * | 9/2005 | Abramov | 242/400.1 |
| 2003/0060241 | A1 * | 3/2003 | Loprete | 455/568 |

* cited by examiner

*Primary Examiner*—Curtis Kuntz
*Assistant Examiner*—Phylesha Dabney
(74) *Attorney, Agent, or Firm*—Charles J. Kulas

(57) ABSTRACT

An earpiece unit is held adjacent to or within a cell phone. The earpiece includes a microphone and speaker and is wearable in a user's ear. The earpiece is docked within the housing of a cell phone and can be used in the docked position to operate the phone. A user can push on the back of the earpiece to eject the earpiece from the phone housing so that the earpiece can be easily inserted into the user's ear. The user can be provided with a "pause" control on the cell phone that indicates to the cell phone system that a call is going to be answered. Upon activation of the "pause" control, the cell phone system can pause its efforts to establish communications and/or temporarily reduce the intensity of transmissions. A message is sent to the caller notifying that the call is about to be answered.

12 Claims, 4 Drawing Sheets

DOCKABLE EARPIECE FOR PORTABLE PHONES

BACKGROUND OF THE INVENTION

Today's cell phones provide "earpiece" microphones and speakers as an accessory to the cell phone. Such earpiece units fit into, onto, or around the ear. The earpiece units are small and can be connected to the cell phone by a thin wire, or they can be wireless (e.g., Bluetooth, Wi-Fi or other radio frequency, infrared, etc.). These units are popular because they are lightweight, allow a user to have free hands, and place the cell phone unit away from the user's head. The latter effect is desirable among many users as there is a belief that cell phone emanations can be harmful.

Although the earpiece units work well and provide benefits, they have a drawback in that they are often awkward or cumbersome to put on quickly. Often a user must answer a phone call within a few rings and there is not enough time to put on, attach, activate, or otherwise handle an earpiece. Another problem is that the earpiece is a separate unit from the cell phone and the user must remember to bring the earpiece along, and have the earpiece handy when the cell phone is being used.

BRIEF SUMMARY OF THE INVENTION

One embodiment of the invention provides an earpiece unit that attaches, or mounts, adjacent to or within a cell phone. In a preferred embodiment, an earpiece includes a microphone and speaker (or other audio means for input and output, e.g., a transducer) and is wearable in a user's ear. The earpiece is docked within the housing of a cell phone and can be used in the docked position to operate the phone. A user can push on the back of the earpiece to eject the earpiece from the phone housing so that the earpiece can be easily inserted into the user's ear for remote use (i.e., away from the cell phone).

In the remote, or undocked, mode the earpiece unit can communicate with the cell phone by wired, wireless or other communication means.

The user can dock the earpiece by pushing the cell phone to the earpiece in a reverse maneuver from the undocking procedure. In a preferred embodiment, the user is provided with a "pause" control on the cell phone that indicates to the cell phone system that a call is going to be answered. Upon activation of the "pause" control, the cell phone system can pause its efforts to establish communications and the cell phone can go into a dormant, or low transmission state. This allows the user to put the cell phone to the user's ear without the danger of heightened power transmissions of the type typically used to set up a cell phone call.

In a preferred embodiment the cell phone system also reacts to the user's activation of the pause control by notifying the caller that the call will be answered imminently. An audible message such as "your call is being answered, please wait" can be sent to the caller. After circuitry in the cell phone detects that the user has ejected (undocked) the earpiece, and after a safety interval (e.g., 3 seconds) the cell phone resumes high power transmission with the cell phone system to establish a connection and to transfer voice and other information. At this point it is assumed that the user has positioned the earpiece properly and is ready to talk.

Another aspect of the invention allows the pause control to be located remotely from the cell phone, such as on a ring, wristband, wristwatch, steering wheel of a car, etc. so that a user can easily and quickly notify the cell phone that the call will be answered. When a remote pause control is activated the cell phone system may provide an extended interval of time for a user to get situated (e.g., earpiece on) to receive the call.

Another embodiment of the invention uses a cell phone holder with a clip or other carrier for the earpiece. This approach does not require that the earpiece is integral with the cell phone so that the carrier and earpiece can be after market products. The carrier acts merely to hold the earpiece adjacent to the cell phone using a clip, bracket, shutter, or other method or device.

One version of the carrier is designed to allow wire-connected earpieces to store the wire within a compartment. The earpiece is also held in the compartment and the other end of the wire is plugged into the cell phone. The earpiece in the docked mode held at about the same position as a speaker mechanism that is integral with the cell phone so that the user can use the phone and earpiece when the earpiece is docked. The earpiece can be undocked and inserted into the user's ear in a single motion by pressing on the back of the earpiece with a finger, similar to the embodiment where the dockable earpiece is inside the cell phone housing.

In one embodiment the invention provides an apparatus for using a portable phone, the apparatus comprising an audio transducer for generating audible sound; and a holder for holding the audio transducer adjacent to the portable phone.

In another embodiment the invention provides a method for answering a portable phone, the method comprising activating a control signal prior to speaking on the portable phone, wherein the control signal indicates that an incoming call will be answered.

In another embodiment the invention provides a method for providing a microphone/speaker device in association with a portable phone, the method comprising removably affixing the device adjacent to the portable phone.

In another embodiment the invention provides an apparatus for answering a portable phone, the apparatus including a control for generating a pause signal; and a playback circuit responsive to the pause signal for sending a predefined message over a cellular network.

DETAILED DESCRIPTION OF THE INVENTION

Figure 1:
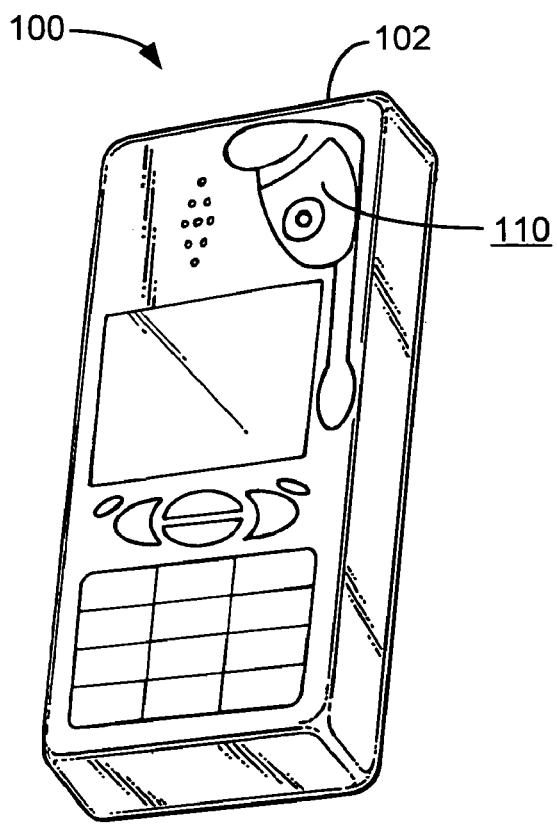
FIG. 1 shows a cell phone with a dockable earpiece contained within a housing.

FIG. 1 shows a cell phone with a dockable earpiece contained within a housing.

In FIG. 1, cell phone 100 includes housing 102. Within housing 102 is earpiece 110. Although not shown in FIG. 1, portions of earpiece 102 can be completely within the confines of the cell phone housing while other portions can protrude from the housing. The housing has sufficient cut outs, or other mechanisms (e.g., doors, flaps, slots, moveable coverings, etc.) so that the earpiece can be easily pushed out from the housing.

Figure 2:
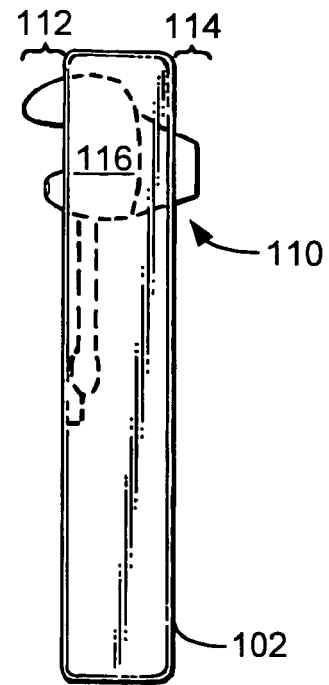
FIG. 2 shows a side view of the cell phone of FIG. 1.

FIG. 2 shows a side view of the cell phone of FIG. 1. In FIG. 2, it is possible to see the different portions of earpiece 110 that are within and without housing 102. In general, items with the same reference number in different Figures are intended to represent the same object.

In FIG. 2, front earpiece portion 112 protrudes from the front of the cell phone housing. Back earpiece portion 114 protrudes from the back of the housing, while middle portion 116 is within the housing. Naturally other embodiments can have more or less portions protruding or within the housing as desired. As shown in other embodiments, below, the entire earpiece can be outside of the cell phone housing. Much of the orientation of the earpiece within the cell phone housing depends upon both the cell phone design and the earpiece design. Any manner of layout, orientation, shape, or other characteristics of the earpiece and cell phone are possible.

Figure 3:
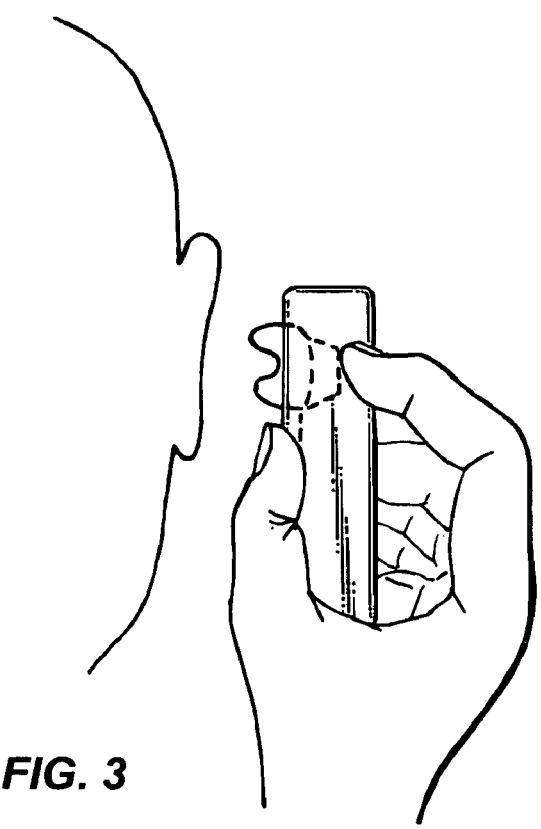
FIG. 3 illustrates a user in the process of undocking the earpiece.

FIG. 3 illustrates a user in the process of undocking the earpiece. The user pushes on the back of the earpiece with a finger to dislodge the earpiece from the cell phone and to easily put the earpiece into the user's ear. One embodiment uses an earpiece that is shaped to a user's ear. As is known in the art, the shape of the rubbery and somewhat flexible earpiece is snug enough within the ear contours so that the earpiece will stay in place. Other types of earpieces may have a portion that loops around, or hangs from, the outer ear. Yet other earpieces may fit entirely inside of the ear and not rely on contours of the outer ear to stay in place. In general, any type of earpiece design can be used with the present invention.

The earpiece can be secured by friction or by any mechanical means such as by a clasp, spring grips, moveable pin, detent protrusion, etc. Any approach to detachably securing the earpiece to the cell phone in the docked position, while still allowing undocking with slight finger pressure is acceptable. Note that the cell phone can be used as normal when the earpiece is docked as the earpiece approximates the speaker position of a standard cell phone (i.e., at the top of the cell phone). Other approaches can have a separate speaker in the cell phone to emit sound if it is not desirable to use the earpiece speaker when the earpiece is docked.

Figure 4:
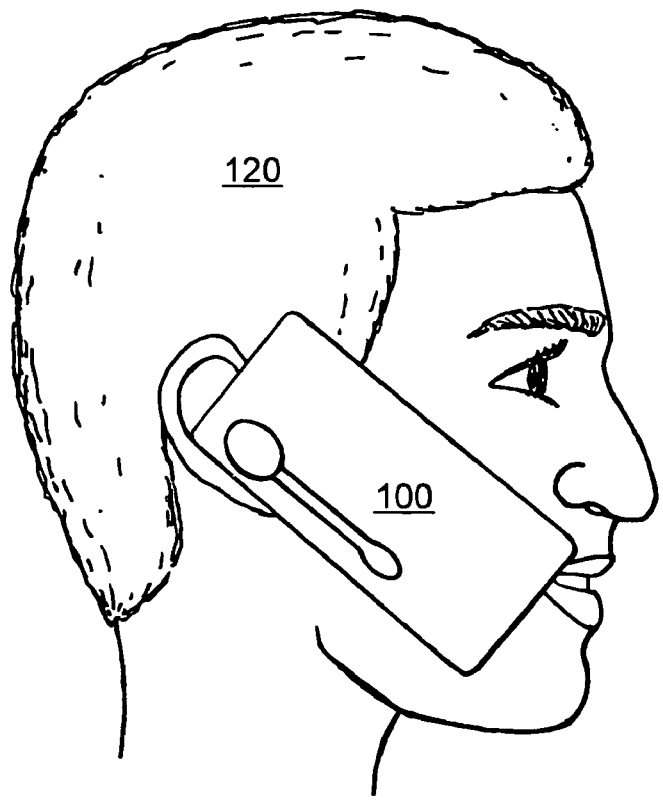
FIG. 4 shows cell phone adjacent to user's ear.

FIG. 4 shows cell phone 100 adjacent to user 120's ear. Note the position of earpiece 110 oriented at approximately the correct angle for earpiece insertion to the ear according to the shape of the earpiece and contour of the outer ear. Where different types of earpieces are used, such positioning may not be critical. However, where an earpiece that requires correct angle positioning is used it is desirable to make the angle of the earpiece align with the natural angle that a user would hold the cell phone.

Figure 5:
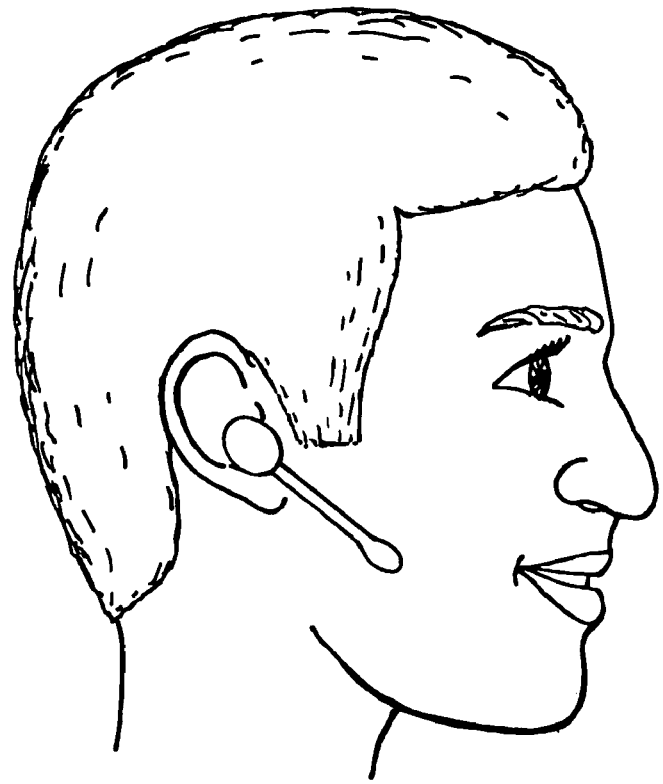
FIG. 5 illustrates the earpiece undocked from the cell phone and set into the user's ear.

FIG. 5 illustrates the earpiece undocked from the cell phone and set into the user's ear. Once the earpiece is set the cell phone can be removed, such as held in the user's hand at arm's length. In the example of FIGS. 1-5 the earpiece is of the wireless type. However, a wired earpiece can also be used, in which case a wire would connect the cell phone with the earpiece. The wire can be unrolled from a loop as the wire is drawn out when the cell phone is moved away from the earpiece. The wire can be brought back into the cell phone housing by a take up spindle or by other means.

Figure 6:
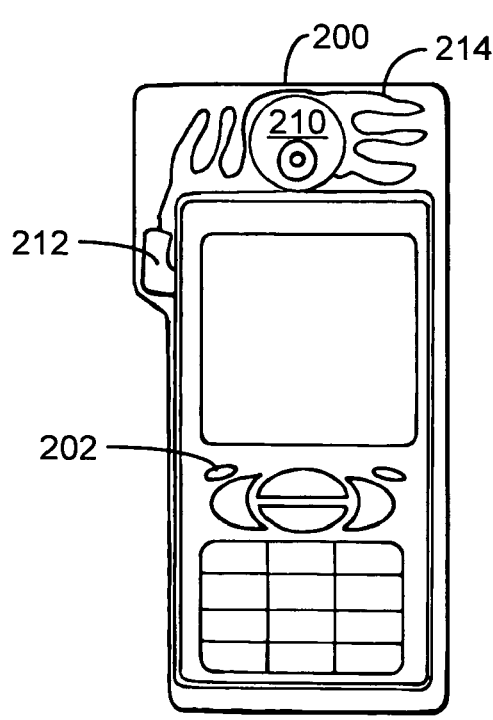
FIG. 6 illustrates an earpiece carrier.

FIG. 6 illustrates an earpiece carrier. Earpiece carrier 200 can be an after-market add-on to a standard cell phone. The carrier can clip onto the cell phone by designing the carrier to close tolerance with the cell phone dimensions. If the carrier is slightly flexible plastic then the plastic can be separated at one or more points to allow the cell phone to be placed into the carrier. When pressure is released from the points the carrier will resume its shape and close around the cell phone to securely hold the cell phone.

The carrier of FIG. 6 is designed to house a wired earpiece having an earpiece body 210, connector 212 and cord 214. As shown, the carrier surrounds connector 212 which is plugged into the cell phone so as to make an electrical connection. Cord 214 is irregularly coiled or folded into the compartment of the carrier above cell phone 202. Earpiece body 210 is secured to the carrier by hinged doors that are discussed below.

Figure 7:
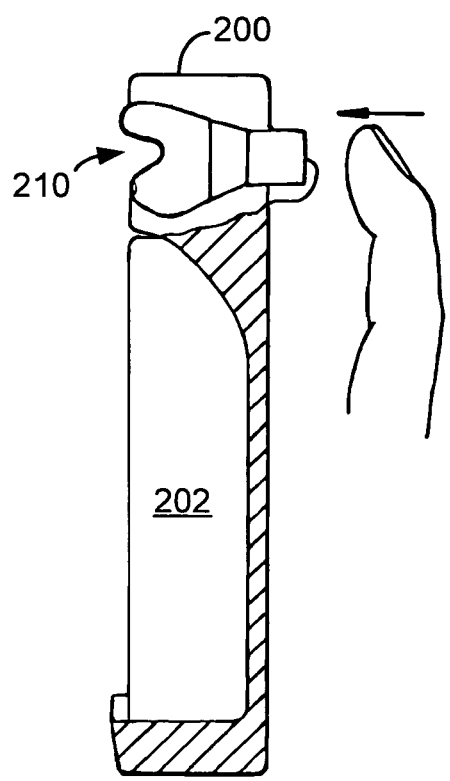
FIG. 7 shows a side view of the earpiece carrier of FIG. 6.

FIG. 7 shows a side view of the earpiece carrier of FIG. 6.

In FIG. 7, a user can push on the back of earpiece body 210 with a finger to force the earpiece body from carrier 200 and into a user's ear, similar to the approach discussed above in connection with FIG. 3. Note that even when the earpiece of FIG. 7 is docked that it is still useable by a user as it is located in a position near the top of cell phone 202 where the speaker is normally located. Also, the earpiece microphone can pick up vibrations and convey them as voice information through the earpiece to the cell phone. Such vibrations will be clearer if the earpiece is allowed to protrude somewhat toward the front of the phone so that the earpiece body can contact the user's ear or other facial structures more completely. Other approaches to earpiece microphones can use different techniques to allow the user to operate the cell phone while the earpiece is in the docked position. For example, a small microphone can be used in the earpiece oriented such that voice transmission is not primarily dependent upon transmission by vibration through earpiece or cell phone materials.

In many cell phones the act of inserting a plug, such as plug 212 of FIG. 6, into the cell phone causes the built-in microphone and speaker of the cell phone to be inoperable. In such a case, the user will have to use the earpiece so it will be most practical if the earpiece is usable in either docked or undocked positions. In other cell phones there may be a selector control, such as a button or switch, that allows a user to select earpiece or non-earpiece (i.e., cell phone built in microphone and speaker) operation.

Figure 8:
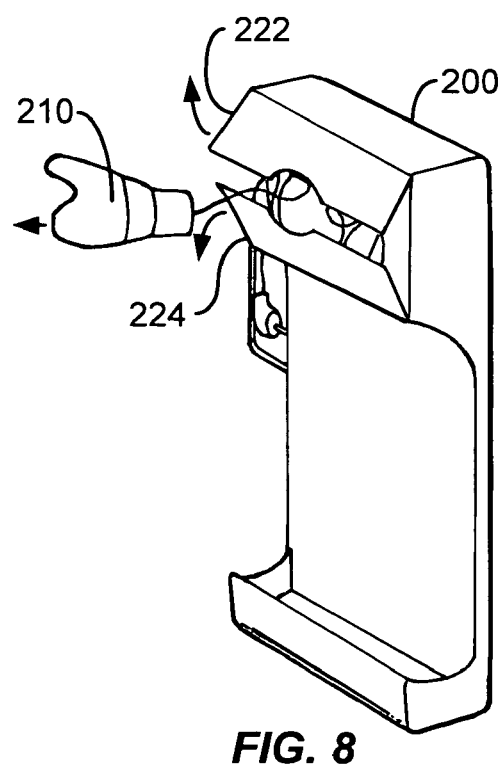
FIG. 8 shows a perspective view of the top portion of the carrier of FIGS. 6 and 7.

FIG. 8 shows a perspective view of the top portion of the carrier of FIGS. 6 and 7.

In FIG. 8, earpiece body 210 has been pushed out of carrier 200. The pushing out of the earpiece body causes doors 222 and 224 to rotate outward in the direction of the arrows. The earpiece is set into the user's ear, as before. As the carrier and cell phone are brought away from the earpiece set in the user's ear the cord is played out through spaces between the doors. In a preferred embodiment the doors are hinged stiffly enough to hold the earpiece body and cord inside the compartment of the carrier, yet not so stiff that the doors can not be easily opened by forward pressure on the back of the earpiece—as with a finger. In one embodiment the user can manually stuff the cord back into the compartment. Other embodiments can use a spring take-up reel system or other approach to automatically retract the cord.

Note that any shape, size and design of compartment and carrier can be employed. It is possible (and may be desirable) to merely have a carrier with a large enough compartment to hold the earpiece and cord. In such a case the user can simply open up the compartment by hand, remove the earpiece, and set the earpiece into the ear.

Figures 9, 10:
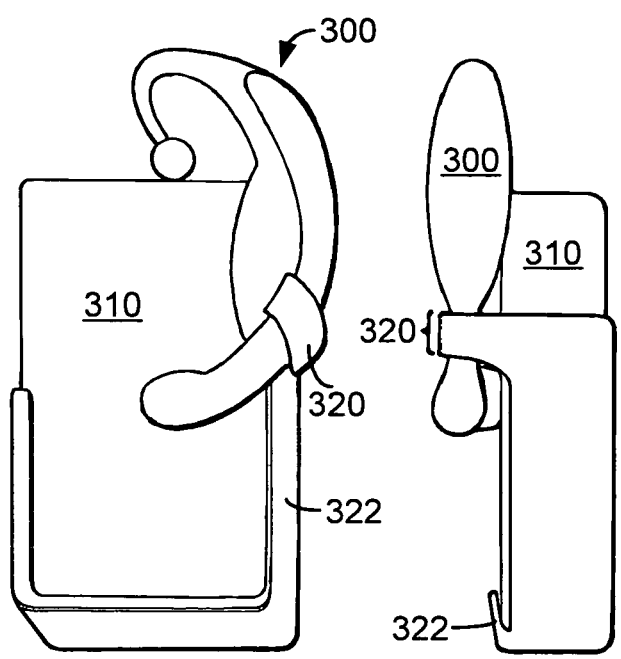
FIG. 9 shows an earpiece carrier with a clip.
FIG. 10 shows the carrier of FIG. 9 in a side view.

FIG. 9 shows an earpiece carrier with a clip.

In FIG. 9, cell phone 310 is provided with carrier 322 that attaches to the cell phone housing. Clip 320 is formed into the carrier so that earpiece 300 can be detachably secured in proximity to the cell phone. In FIG. 9, the back of cell phone 310 is shown. The earpiece is clipped onto the back of the cell phone so as not to obstruct the user from controls on the front of the cell phone.

FIG. 10 shows the carrier of FIG. 9 in a side view.

In FIG. 10, carrier 322 includes clip 320 to hold earpiece 300 adjacent to cell phone 310. This approach may be desirable as a simple solution to keep an earpiece handy, especially when the size of the earpiece is comparably large to the size of the cell phone. In general, however, any type of clip or other means (e.g., spring clip, adhesive or sticky material, Velcro, friction, etc.) can be used to detachably hold the earpiece adjacent to the cell phone.

Figure 11:
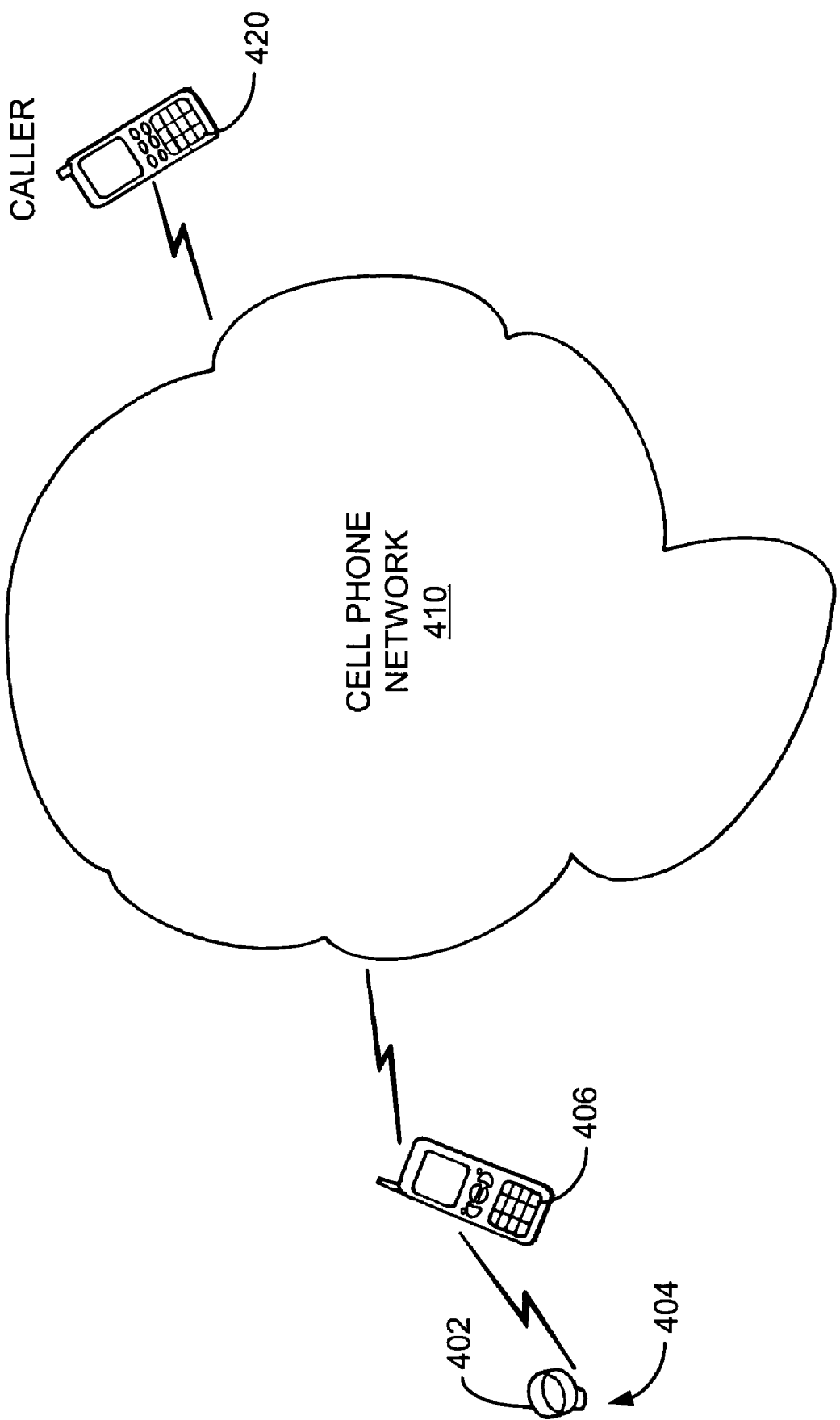
FIG. 11 illustrates a pause button feature.

FIG. 11 illustrates a pause button feature of an embodiment of the present invention.

In FIG. 11, cell phone 406 receives a call from caller 420. The call can be placed normally via cell phone network 410. Other networks, such as the standard phone systems (aka "plain old telephone system" or POTS), voice over Internet Protocol (VoIP), radio transmission or other communication links or systems can also be used. Cell phone 406 can alert a user normally as with a ring or vibration. Pause button 404 is shown on ring 402. In this case the pause button is on the bottom of a ring worn on one of the four fingers of a hand so that the button can be activated with a thumb. In other embodiments the button can be any type of control (e.g., switch, slider, motion detector, voice detector or voice recognition unit, etc.) affixed or associated with any suitable object. Preferable the object is wearable such as jewelry, a wristwatch, etc. so that the pause button is easily accessed even when the cell phone may be out-of-the-way such as in a purse, pocket, luggage, etc.

Even where the cell phone is easily reachable it may be desirable for a user to use the pause button approach to answering a cell phone in order to reduce the user's exposure to cell phone radiation. When the pause control is activated a signal is sent to the cell phone. The signal can be radio frequency, infrared, etc. In some embodiments the pause button can be located on the cell phone itself as it can still provide benefits such as allowing the user more time to talk on the cell phone, plug attachments into the cell phone, or for other reasons.

When cell phone 406 receives the pause control signal it can handle the incoming call in a number of ways. A first way is to automatically answer the call at the cell phone and present the caller with a pre-recorded message such as "just a minute—your call is being answered." In this case there is no reason to have any special processing or modification to a standard cell phone network such as cell phone network 410. The user can take as much time as the caller will stand and then begin speaking.

A second approach is for an indication of the pause signal to be sent to cell phone network 410 so that the cell phone network can permit a break in any expected cell phone transmissions. The cell phone can also go into a suspend (i.e., paused) mode where it is acceptable to have a halt in transmission broadcast to the cell phone network. This will allow a user with a docked earpiece to bring the phone to the user's ear and insert the earpiece without full-strength broadcast from the cell phone. The pause in transmission (or lowered power transmission) can occur after the cell phone transmits the automatic message to the caller. A light can be used to indicate to the user when the cell phone has gone into a paused state during receiving a call. Alternatively, the pause signal can be sent to the cell phone network where a "please wait" message is generated for the caller. In this last case there is no need for the user's cell phone to generate the message so a delay due to sending the message is avoided.

One embodiment uses a sensor to detect when a docked earpiece is being ejected for placement into a user's ear. Upon detection, a pause signal is generated and the actions described above can be taken. In a case where the user is making an outgoing call transmission from the cell phone will not start until the user performs other actions, such as dialing a number, so the use of the pause signal is not necessary.

Although embodiments of the invention have been described primarily with respect to a cell phone, any type of communication device (e.g., walkie talkie, personal digital assistant, intercom, radio transmitter, etc.) can benefit from features of the invention. Other consumer electronics products such as audio players, recording devices, computers, etc., can similarly benefit from features of the invention.

Although carriers and compartments have been presented for holding earpieces adjacent to cell phones, other items may similarly be held or placed. For example, a paper address book, computer, audio player, keys, batteries, etc., can be attached to a cell phone by means of the carrier assembly.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

Thus, the scope of the invention is to be determined solely by the appended claims.

What is claimed is:

1. An apparatus for using a portable phone, the apparatus comprising:
    an audio transducer for generating audible sound, wherein the audio transducer includes a microphone;
    a holder for detachably holding the audio transducer adjacent to the portable phone in a position such that the audio transducer can be placed adjacent to an ear of a user while the audio transducer is held by the holder and the user speaks into the phone; and
    an undocking mechanism for allowing a user to simultaneously detach the audio transducer from the portable phone and attach the audio transducer adjacent to an ear of the user by using a force applied by a finger of the user to move the audio transducer in a direction of the ear of the user.

2. The apparatus of claim 1, wherein the audio transducer is coupled to the portable phone by a wire, the holder further comprising:
    a compartment for storing the wire.

3. The apparatus of claim 1, further comprising
    a control for generating a signal; and
    a mechanism acting in response to the signal for decreasing transmissions from the portable phone.

4. The apparatus of claim 1, further comprising:
    a control for generating a signal; and
    an audio playback circuit for sending a predefined message over a portable phone network in response to the signal.

5. The apparatus of claim 1, wherein the audio transducer is wearable adjacent to a human ear.

6. The apparatus of claim 1, wherein the audio transducer is held by the holder in a position substantially interior to a housing of the portable phone.

7. The apparatus of claim 1, wherein the holder includes a carrier, wherein the carrier is removably attached to the portable phone.

8. The apparatus of claim 1, wherein the undocking mechanism allows a user to undock the audio transducer by applying a force to the back of the audio transducer.

9. The apparatus of claim 8, wherein the force is applied in the direction of an ear of the user so that the force also serves to attach the audio transducer adjacent to the user's ear.

10. The apparatus of claim 9, wherein the force is applied by a single index finger of the user.

11. The apparatus of claim 1, wherein the audio transducer is included within a contoured enclosure, wherein the contoured enclosure substantially matches at least one of a human ear's contours, the holder acting to provide the contoured enclosure in a predetermined position to match a user's ear contours when the portable phone is held in a normal operating position by the user.

12. The apparatus of claim 1, wherein the audio transducer is included within an enclosure, wherein at least a portion of the enclosure protrudes from a surface of the portable phone.

* * * * *